(12) United States Patent
Kiyokawa

(10) Patent No.: US 11,882,864 B2
(45) Date of Patent: Jan. 30, 2024

(54) SHEET-SHAPED COOKED RICE FORMING JIG

(71) Applicant: POTAMA CO., LTD., Naha (JP)

(72) Inventor: Katsuaki Kiyokawa, Naha (JP)

(73) Assignee: POTAMA CO., LTD., Okinawa (JP)

( * ) Notice: Subject to any disclaimer, the term of this patent is extended or adjusted under 35 U.S.C. 154(b) by 734 days.

(21) Appl. No.: 16/637,203

(22) PCT Filed: May 14, 2019

(86) PCT No.: PCT/JP2019/019183
§ 371 (c)(1),
(2) Date: Feb. 6, 2020

(87) PCT Pub. No.: WO2020/230275
PCT Pub. Date: Nov. 19, 2020

(65) Prior Publication Data
US 2021/0401028 A1    Dec. 30, 2021

(51) Int. Cl.
*A23P 30/10* (2016.01)
*A47J 43/20* (2006.01)
(Continued)

(52) U.S. Cl.
CPC .............. *A23P 30/10* (2016.08); *A23L 7/143* (2016.08); *A47J 43/20* (2013.01); *A47J 43/288* (2013.01); *A23V 2002/00* (2013.01)

(58) Field of Classification Search
CPC ......... A47J 43/288; A47J 43/20; A23P 30/10; A23L 7/143
See application file for complete search history.

(56) References Cited

U.S. PATENT DOCUMENTS 2,485,521 A * 10/1949 Wendt .................. A47J 43/288
294/7
6,490,796 B1 * 12/2002 Armienta .............. A47J 43/288
30/142
(Continued)

FOREIGN PATENT DOCUMENTS

DE     102004020243 A1 * 11/2005  ............. A47J 43/20
JP     S48-72396 U       9/1973
(Continued)

OTHER PUBLICATIONS

International Search Report dated Aug. 13, 2019 for PCT/JP2019/019183 (Japanese only).
(Continued)

*Primary Examiner* — Seyed Masoud Malekzadeh
(74) *Attorney, Agent, or Firm* — LUCAS & MERCANTI, LLP

(57) ABSTRACT

A sheet-shaped cooked rice forming jig includes: a forming frame for forming a sheet-shaped cooked rice, the sheet-shaped cooked rice being formed by packing a cooked rice in the forming frame; and a leveling spatula for leveling the cooked rice packed in the forming frame into a sheet shape. The forming frame is a flat-plate-like member having a predetermined thickness where upper and lower surfaces of the forming frame are formed into a flat surface. The forming frame is formed in a window shape in an endless manner so as to form a cooked rice packing portion in a penetrating manner inside the forming frame. The cooked rice is packed into the cooked rice packing portion, and the leveling spatula is formed of: a grip portion; and a spatula body portion extending from a distal end of the grip portion and having a flat shape.

6 Claims, 11 Drawing Sheets

(51) Int. Cl.
*A47J 43/28* (2006.01)
*A23L 7/143* (2016.01)

(56) References Cited

U.S. PATENT DOCUMENTS

| | | | |
|---|---|---|---|
| 7,011,015 B1* | 3/2006 | Marghella | A21D 13/44 |
| | | | 294/7 |
| 10,398,261 B2* | 9/2019 | Li | A47J 43/288 |
| 2011/0191975 A1 | 8/2011 | Genatossio et al. | |
| 2018/0177342 A1* | 6/2018 | Li | A47J 43/288 |

FOREIGN PATENT DOCUMENTS

| | | |
|---|---|---|
| JP | S58-100745 U | 7/1983 |
| JP | H02-124068 A | 5/1990 |
| JP | H04-16584 U | 2/1992 |
| JP | H11-169307 A | 6/1999 |
| JP | H11-318363 A | 11/1999 |
| JP | 2009121168 A | 6/2009 |
| JP | 2010124710 A | 6/2010 |
| JP | 3187074 U | 11/2013 |

OTHER PUBLICATIONS

Office Action dated Apr. 4, 2023 for the corresponding Japanese patent application No. 2021-519107, with English translation.
Office Action dated Apr. 4, 2023 for the corresponding Singapore patent application No. 11202111452U.

* cited by examiner (a)

(b)

(a)

(b)

(a)

(b)

SHEET-SHAPED COOKED RICE FORMING JIG

CROSS REFERENCE TO RELATED APPLICATION

This Application is a 371 of PCT/JP2019/019183 filed on May 14, 2019 which is incorporated herein by reference.

TECHNICAL FIELD

The present invention relates to a sheet-shaped cooked rice forming jig used for forming a cooked rice into a flat sheet shape having a uniform thickness by leveling.

BACKGROUND ART

Conventionally, a cooked rice food such as a rolled sushi having a rolled shape and a rice ball having a folded shape have been popularly eaten. These foods are formed by using a cooked rice formed in a sheet shape (hereinafter referred to as a sheet-shaped cooked rice). The rolled sushi having a rolled shape is formed by placing ingredients such as omelet or gourd strip inside the sheet-shaped cooked rice and by wrapping ingredients such as rolled omelet or dried gourd shavings by the sheet-shaped cooked rice. The rice ball having a folded shape is formed by wrapping such ingredients in a two-folded manner.

Such a sheet-shaped cooked rice is formed in a flat sheet shape having a fixed thickness in such a manner that a cooked rice lump is placed on a sheet-shaped food such as, for example, a dried seaweed, a dried kelp or a shiso leave which is formed into a fixed sheet shape by working, and the cooked rice lump is leveled and spread over the entire surface of the sheet-shaped food along a periphery of the sheet-shaped food using a rice scoop and the like while preventing the leveled and spread cooked rice from projecting from the surface of the sheet-shaped food.

Such an operation of forming a sheet-shaped cooked rice basically depends on a length of experience or an expertise of an operator. Accordingly, when a degree of leveling or spreading of a cooked rice lump is insufficient or the cooked rice lump is leveled or spread only in a fixed direction in a deflecting manner, raised and indented portions which differ in an amount of cooked rice are formed on the sheet-shaped food and hence, a thickness of the sheet-shaped cooked rice becomes non-uniform at some portions thus forming so-called "cooked rice non-uniform thickness spots".

Such "cooked rice non-uniform thickness spots" become an obstacle in wrapping ingredients by a sheet-shaped cooked rice and deforms a rolled shape or a folded shape of a cooked rice food thus giving rise to a drawback that a texture and external appearance in design of the cooked rice food is impaired.

To manufacture a sheet-shaped cooked rice which overcomes such "cooked rice non-uniform thickness spots", for example, various proposals have been made with respect to a sheet-shaped cooked rice manufacturing device which includes a leveling mechanism for leveling a cooked rice flat on a conveyor supplied from a hopper (see patent literature 1, for example). However, such a device is large-sized and complicated and hence, the device requires a large installation space. Further, a manufacturing cost of the device itself and a cost for maintenance of the device become enormous and hence, the device is disadvantageous also from a viewpoint of cost.

In view of the above, there has been proposed a sheet-shaped cooked rice forming jig which includes a forming frame having a bottomed quadrangular shape connected to a distal end of a grip portion (see patent literature 2, for example).

Such a sheet-shaped cooked rice forming jig can be manufactured at a low cost, does not require a large installation space, and can be easily used by anybody. Further, a sheet-shaped cooked rice having a fixed thickness and a predetermined shape can be obtained by removing a cooked rice lump formed by packing a cooked rice lump in a forming frame (hereinafter simply referred to a formed cooked rice lump) from the forming frame.

CITATION LIST

Patent Literature

PTL 1: JP 2010-124710 A
PTL 2: JP H11-318363 A

SUMMARY OF INVENTION

Technical Problem

However, with the use of the above-mentioned conventional sheet-shaped cooked rice forming jig, not only an operation of removing a formed cooked rice lump which is packed in the forming frame and is leveled and spread becomes difficult but also there is a concern that a sheet-shaped cooked rice which conforms to an inner shape of the forming frame cannot be stably and repeatedly formed.

That is, formed cooked rice lump is formed by flattening and spreading a cooked rice lump packed in a forming frame by downwardly pressing the cooked rice lump toward a bottom portion of the forming frame using a rice scoop or the like in the forming frame. Accordingly, a cooked rice having adhesiveness adheres to the bottom portion of the forming frame thus making it difficult to obtain a sheet-shaped cooked rice by removing a formed cooked rice lump from the forming frame.

Further, in an attempt to remove a formed cooked rice lump from the forming frame by peeling in a forced manner, cooked rice adhering to the bottom portion of the forming frame remains as it is and hence, there is a concern that "cooked rice non-uniform thickness spots" where a thickness and a shape of the sheet-shaped cooked rice are not fixed are formed on the sheet-shaped cooked rice. This concern is particularly increased by repeating an operation of forming a sheet-shaped cooked rice.

The present invention has been made in view of the above-mentioned drawbacks, and it is an object of the present invention to provide a sheet-shaped cooked rice forming jig which can be manufactured at a low cost, requires no installation space, is compact in shape, and allows anyone to easily use the jig. Such a sheet-shaped cooked rice forming jig can also repeatedly stably form a sheet-shaped cooked rice having no "cooked rice non-uniform thickness spots" by maintaining a uniform thickness and a uniform shape.

Solution to Problem

To achieve the above-mentioned object, according to an aspect of the present invention, there is provided (1) a sheet-shaped cooked rice forming jig comprising: a forming frame for forming a sheet-shaped cooked rice, the sheet-shaped cooked rice being formed by packing a cooked rice in the forming frame; and a leveling spatula for leveling the cooked rice packed in the forming frame into a sheet shape, wherein the forming frame is a flat-plate-like member having a predetermined thickness where upper and lower surfaces of the forming frame are formed into a flat surface, the forming frame being formed in a window shape in an endless manner so as to form a cooked rice packing portion in a penetrating manner inside the forming frame, the cooked rice being packed into the cooked rice packing portion, and the leveling spatula is formed of: a grip portion; and a spatula body portion extending from one side of the grip portion and having a flat shape.

The sheet-shaped cooked rice forming jig according to the present invention also has the following technical features.

(2) A profile of the forming frame is formed in an approximately quadrangular shape as viewed in a plan view, and the cooked rice packing portion is formed into an approximately quadrangular shape substantially similar to the profile of the forming frame as viewed in a plan view.

(3) The grip portion is formed in a flat elongated shape, and the spatula body portion is formed in an approximately flat square shape such that the spatula body portion is formed continuously with a flat surface of the grip portion and one of four quadrangular corner portions of the spatula body portion or a portion of the spatula body portion in a vicinity of one of four quadrangular corner portions forms a connecting proximal end portion connected with the grip portion, and a center of gravity of the spatula body portion is arranged on an imaginary axis of the grip portion or in a vicinity of the imaginary axis of the grip portion.

(4) The spatula body portion has a curved surface which is gently curved from a proximal end to a distal end of the spatula body portion.

(5) A recessed portion is formed on a portion of the forming frame upper surface where the cooked rice packing portion is formed.

Advantageous Effects of Invention

According to the present invention described in claim 1, a sheet-shaped cooked rice forming jig includes: a forming frame for forming a sheet-shaped cooked rice, the sheet-shaped cooked rice being formed by packing a cooked rice in the forming frame; and a leveling spatula for leveling the cooked rice packed in the forming frame into a sheet shape, wherein the forming frame is a flat-plate-like member having a predetermined thickness where upper and lower surfaces of the forming frame are formed into a flat surface, the forming frame being formed in a window shape in an endless manner so as to form a cooked rice packing portion in a penetrating manner inside the forming frame, the cooked rice being packed into the cooked rice packing portion, and the leveling spatula is formed of: a grip portion; and a spatula body portion extending from one side of the grip portion and having a flat shape. Accordingly, it is possible to acquire an advantageous effect that, for example, only by placing the forming frame on a horizontal flat placing surface of a rolling mat, a sheet-shaped food or the like, by packing a cooked rice lump into the cooked rice packing portion of the forming frame, and by leveling and filling the cooked rice lump in a flat shape along the forming frame by the leveling spatula prepared for an exclusive use, it is possible to simply manufacture a sheet-shaped cooked rice which has a uniform thickness with no "cooked rice non-uniform thickness spots" and conforms with a shape of the cooked rice packing portion.

That is, by simply performing an operation of leveling and spreading a cooked rice lump packed into the cooked rice packing portion in the forming frame substantially parallel in plane by bringing a lower surface of the spatula body portion into contact with an upper surface of the forming frame by the spatula body portion of the leveling spatula prepared for an exclusive use, it is possible to form a formed cooked rice lump having a fixed thickness which conforms with a thickness of the frame by filling the cooked rice over the entire area of the cooked rice packing portion in the frame without forming a gap while preventing the cooked rice from projecting to the outside of the frame.

That is, a surface of the forming frame which is brought into contact with the formed cooked rice lump is an inner peripheral surface of the forming frame which is substantially orthogonal to a downward pressing direction of a cooked rice lump by the leveling spatula. Accordingly, a contact area of the cooked rice which is brought into contact with the frame can be reduced and hence, there is no possibility that a downward stress generated by a leveling operation of the cooked rice is directly applied to the inner peripheral surface of the frame via the cooked rice whereby inadvertent adhesion of the cooked rice to the forming frame can be suppressed as much as possible.

Further, even in the case where the cooked rice is brought into contact with and adheres to the inner peripheral surface of the forming frame, the direction orthogonal to the inner peripheral surface of the forming frame becomes the adhesion direction of the cooked rice to the forming frame. Accordingly, a stress orthogonal to the frame inner peripheral surface can be transmitted with certainty to a portion where the cooked rice adheres to the frame as a separating force for releasing the adhesion of the cooked rice.

Accordingly, in obtaining a sheet-shaped cooked rice by removing a formed cooked rice lump from the forming frame, the forming frame which surrounds an outer periphery of the formed cooked rice lump placed on the flat placing surface can be easily removed by pulling the forming frame upward and hence, it is possible to acquire an advantageous effect that a sheet-shaped cooked rice having no "cooked rice non-uniform thickness spots" and having a fixed shape and thickness can be repeatedly manufactured.

That is, it is possible to acquire an advantageous effect that "leveling and spreading forming operation" where a formed cooked rice lump which conforms with the shape of the cooked rice packing portion in the forming frame is formed by the forming frame and the leveling spatula formed in conformity with the forming frame and "forming frame removal operation" where a sheet-shaped cooked rice is taken out by removing a formed cooked rice lump in the forming frame from the cooked rice packing portion of the frame can be performed accurately and easily.

According to the invention described in claim 2, a profile of the forming frame is formed in an approximately quadrangular shape as viewed in a plan view, and the cooked rice packing portion is formed into an approximately quadrangular shape substantially similar to the profile of the forming frame as viewed in a plan view. Accordingly, the forming frame can be made to confirm with a generally prescribed shape of a sheet-shaped food or a rolling mat, for example, and a flat placing surface of the sheet-shaped food or the rolling mat can be formed as a bottom surface of the cooked rice packing portion in the forming frame by placing the forming frame along the periphery of the sheet-shaped food or the rolling mat and hence, it is possible to acquire an advantageous effect that the sheet-shaped cooked rice where the cooked rice does not project from periphery of the sheet-shaped food or the rolling mat can be formed.

According to the invention described in claim 3, the grip portion is formed in a flat elongated shape, and the spatula body portion is formed in an approximately flat square shape such that the spatula body portion is formed continuously with a flat surface of the grip portion and one of four quadrangular corner portions of the spatula body portion or a portion of the spatula body portion in a vicinity of one of four quadrangular corner portions forms a connecting proximal end portion connected with the grip portion, and a center of gravity of the spatula body portion is arranged on an imaginary axis of the grip portion or in a vicinity of the imaginary axis of the grip portion. Accordingly, by placing a thumb on a flat surface of the grip portion in the vicinity of a proximal end of the spatula body portion and by gripping a trunk portion of the grip portion with fingers other than the thumb, an operation of an operator in upward and downward directions, in frontward and rearward directions, and left and right directions of an operator from the grip portion can be accurately reflected on the spatula body portion disposed at a distal end of the grip portion and hence, it is possible to acquire an advantageous effect that operability of the leveling spatula in a leveling and spreading operation of a cooked rice lump in the forming frame can be enhanced.

According to the invention described in claim 4, the spatula body portion has a curved surface which is gently curved from a proximal end to a distal end of the spatula body portion. Accordingly, it is possible to acquire an advantageous effect that a leveling and spreading operation of a cooked rice lump can be accurately performed while finely adjusting a contact area of the spatula body portion with a cooked rice lump along the curved surface of the spatula body portion.

According to the invention described in claim 5, a recessed portion is formed on a portion of the forming frame upper surface where the cooked rice packing portion is formed. Accordingly, it is possible to acquire an advantageous effect that a cooked rice thickness of a sheet-shaped cooked rice can be adjusted corresponding to the recessed portion.

DESCRIPTION OF EMBODIMENTS

The gist of the present invention lies in a sheet-shaped cooked rice forming jig which includes: a forming frame for forming a sheet-shaped cooked rice, the sheet-shaped cooked rice being formed by packing a cooked rice in the forming frame; and a leveling spatula for leveling the cooked rice packed in the forming frame into a sheet shape, wherein the forming frame is a flat-plate-like member having a predetermined thickness where upper and lower surfaces of the forming frame are formed into a flat surface, the forming frame being formed in a window shape in an endless manner so as to form a cooked rice packing portion in a penetrating manner inside the forming frame, the cooked rice being packed into the cooked rice packing portion, and the leveling spatula is formed of: a grip portion; and a spatula body portion extending from one side of the grip portion and having a flat shape.

A profile of the forming frame is formed in an approximately quadrangular shape as viewed in a plan view, and the cooked rice packing portion is formed into an approximately quadrangular shape substantially similar to the profile of the forming frame as viewed in a plan view.

The grip portion is formed in a flat elongated shape, and the spatula body portion is formed in an approximately flat square shape such that the spatula body portion is formed continuously with a flat surface of the grip portion and one of four quadrangular corner portions of the spatula body portion or a portion of the spatula body portion in a vicinity of one of four quadrangular corner portions forms a connecting proximal end portion connected with the grip portion, and a center of gravity of the spatula body portion is arranged on an imaginary axis of the grip portion or in a vicinity of the imaginary axis of the grip portion.

The spatula body portion has a curved surface which is gently curved from a proximal end to a distal end of the spatula body portion.

A recessed portion is formed on a portion of the forming frame upper surface where the cooked rice packing portion is formed.

Figure 1:
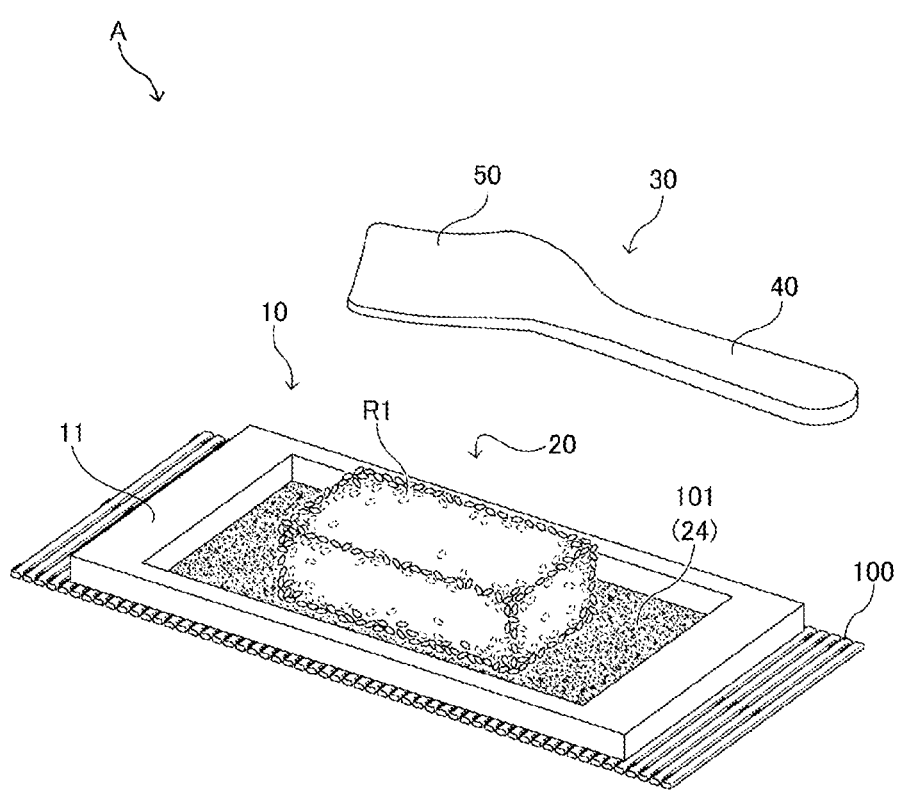
FIG. 1 is a perspective view showing an in-use state of a sheet-shaped cooked rice forming jig according to the present invention.
Figure 2:
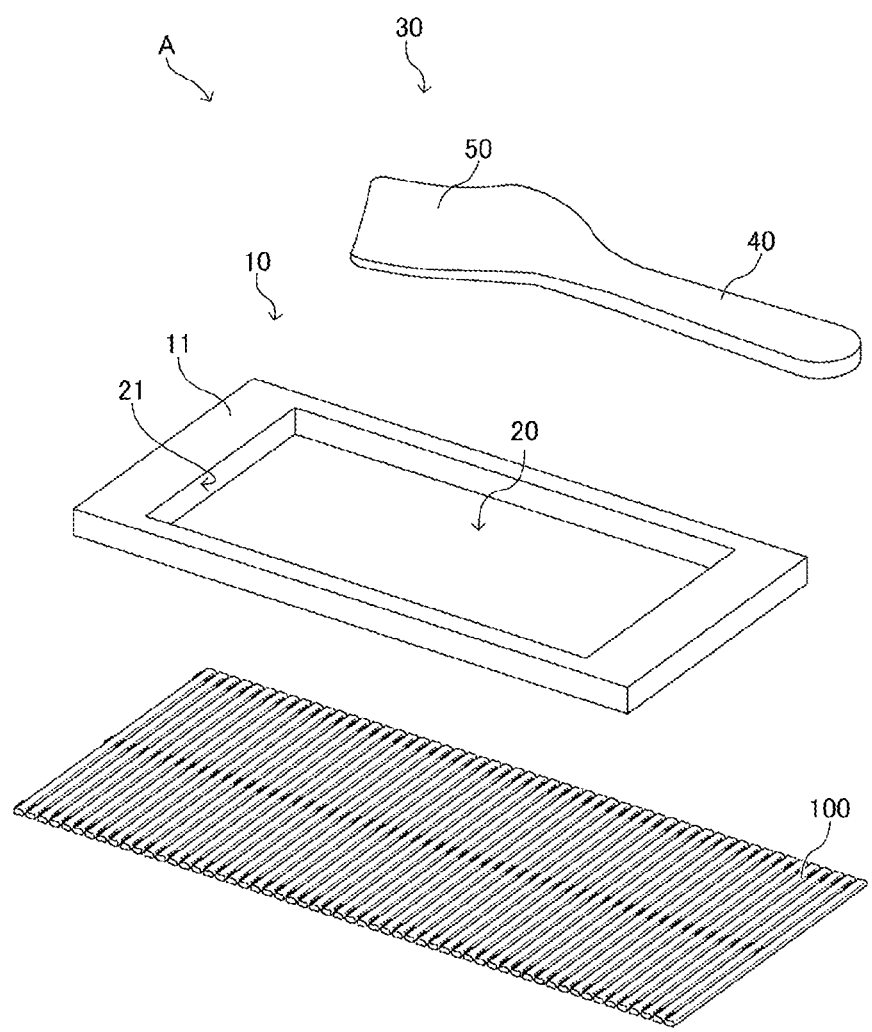
FIG. 2 is a perspective view showing the configuration of the sheet-shaped cooked rice forming jig according to the present invention.
Figure 3:
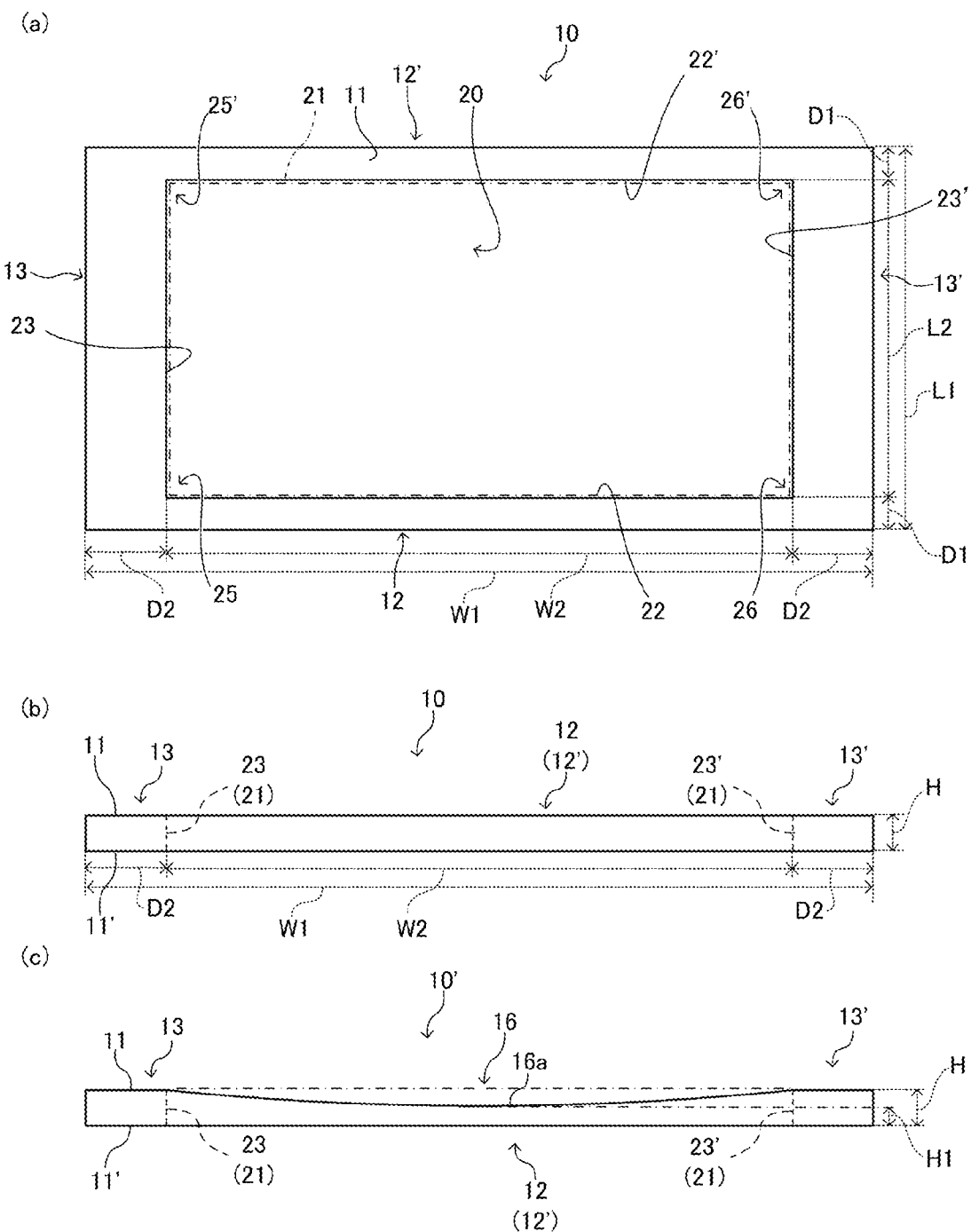
FIG. 3 are a plan view and side views showing the configuration of a forming frame according to the present invention.
Figure 4:
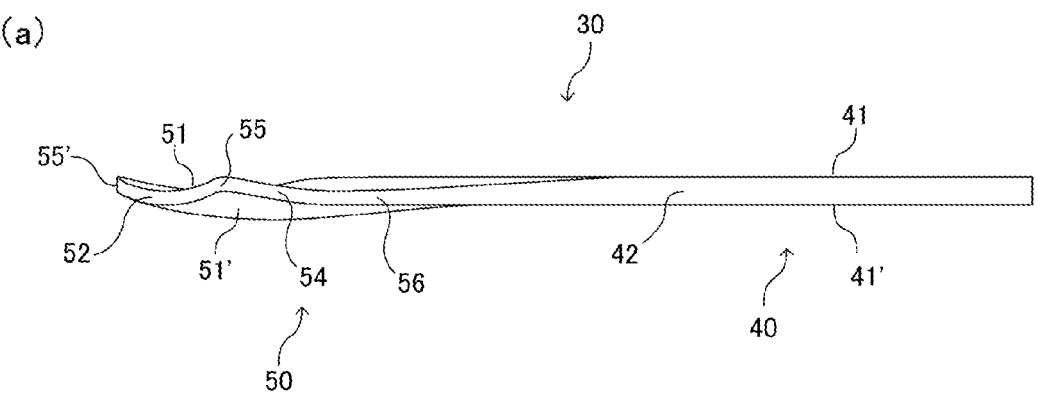
FIG. 4 are a side view and a plan view showing the configuration of a leveling spatula according to the present invention.
Figure 4:
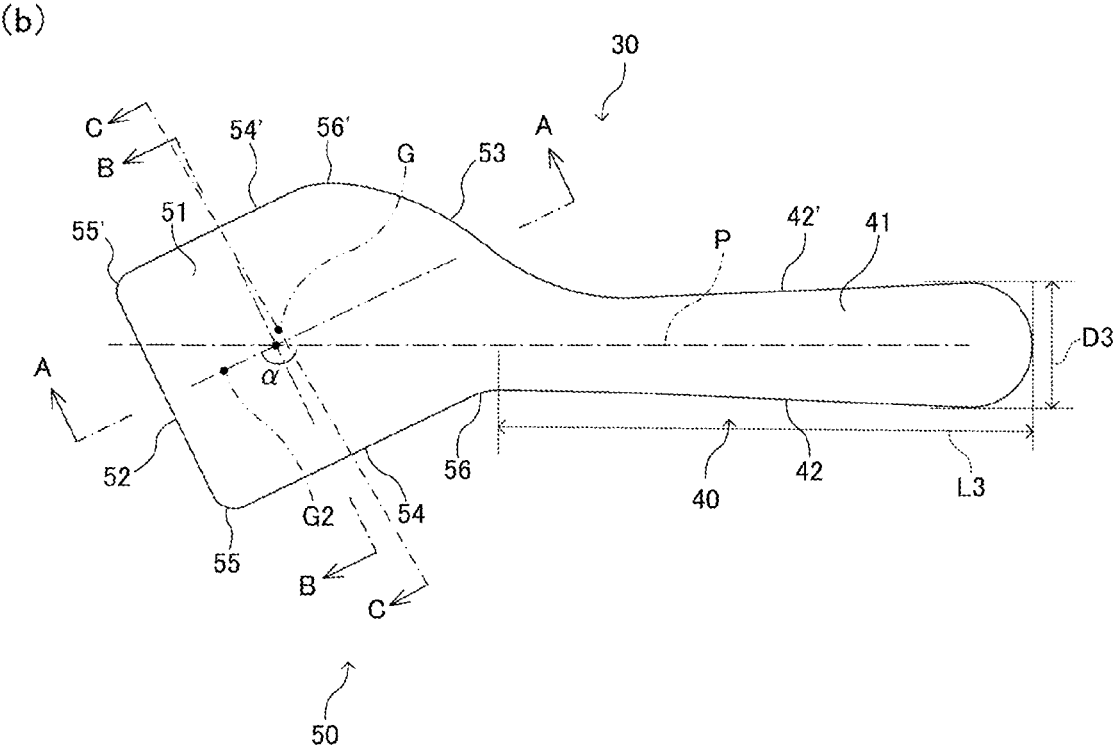

Hereinafter, an embodiment of the present invention is described with reference to drawings. FIG. 1 is a perspective view showing an in-use state of a sheet-shaped cooked rice forming jig. FIG. 2 is a perspective view showing an external appearance of the sheet-shaped cooked rice forming jig. FIG. 3 are a plan view and side views showing the configuration of a forming frame. FIG. 4 are a side view and a plan view showing the configuration of a leveling spatula.

Figure 5:
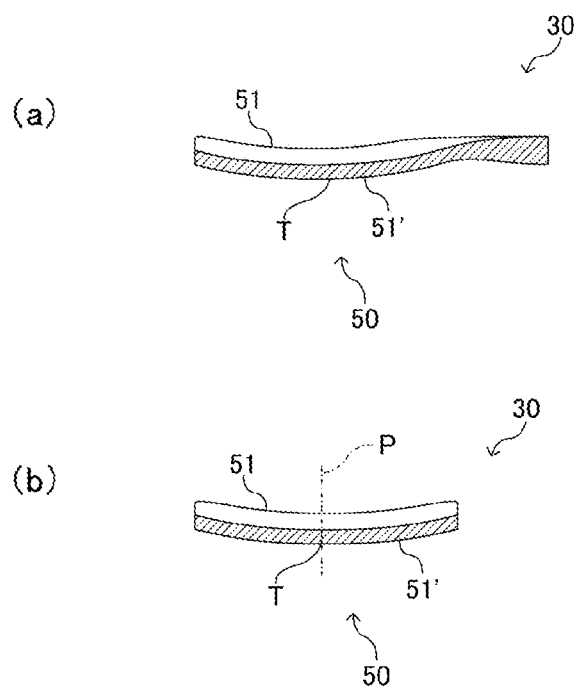
FIG. 5 are cross-sectional views of a spatula body portion of the leveling spatula according to the present invention taken along a line A-A and a line B-B.
Figure 6:
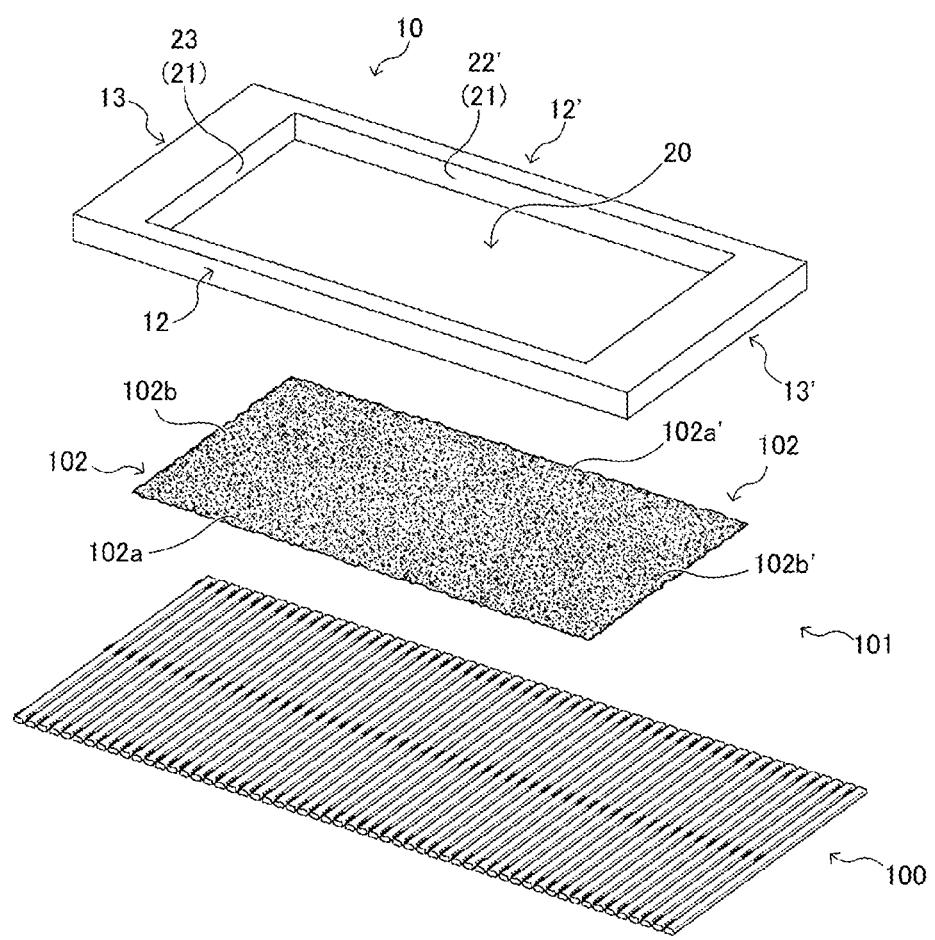
FIG. 6 is a perspective view of the sheet-shaped cooked rice forming jig according to the present invention in an in-use state.
Figure 7:
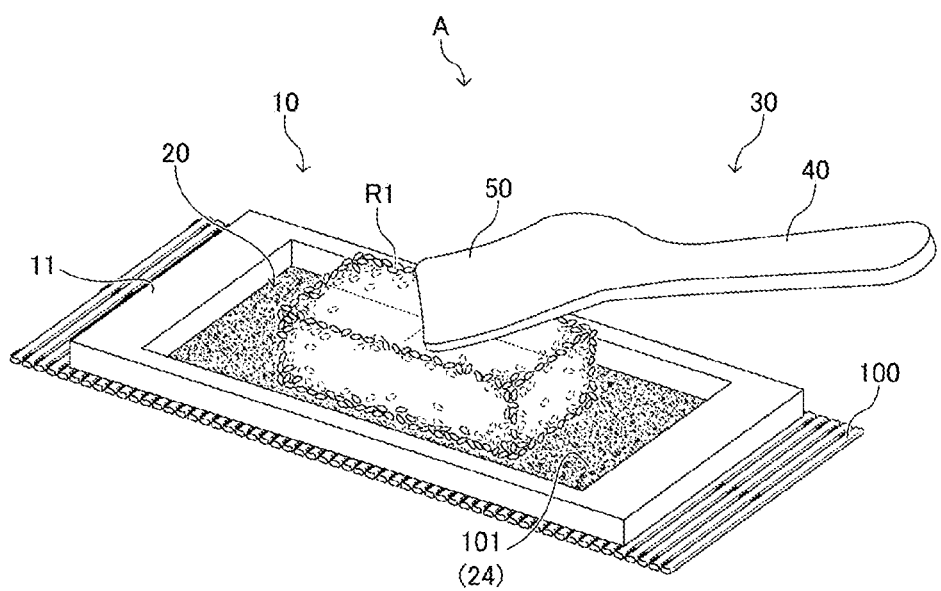
FIG. 7 is a perspective view of the sheet-shaped cooked rice forming jig according to the present invention in an in-use state.
Figure 8:
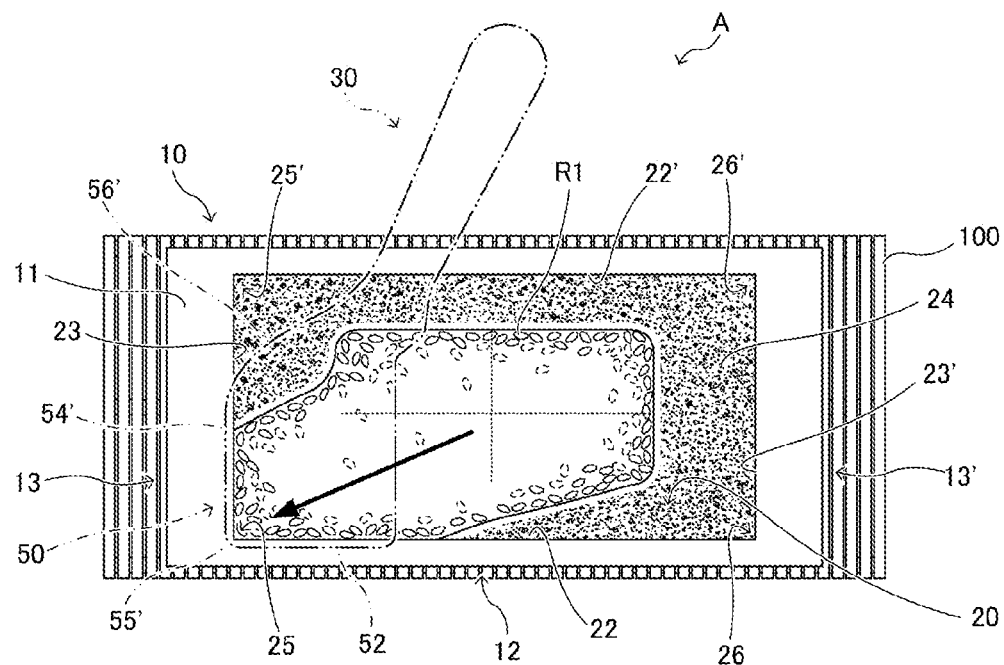
FIG. 8 are schematic plan views showing steps of obtaining a formed cooked rice lump by leveling and spreading cooked rice lump by the leveling spatula in the forming frame according to the present invention.
Figure 8:
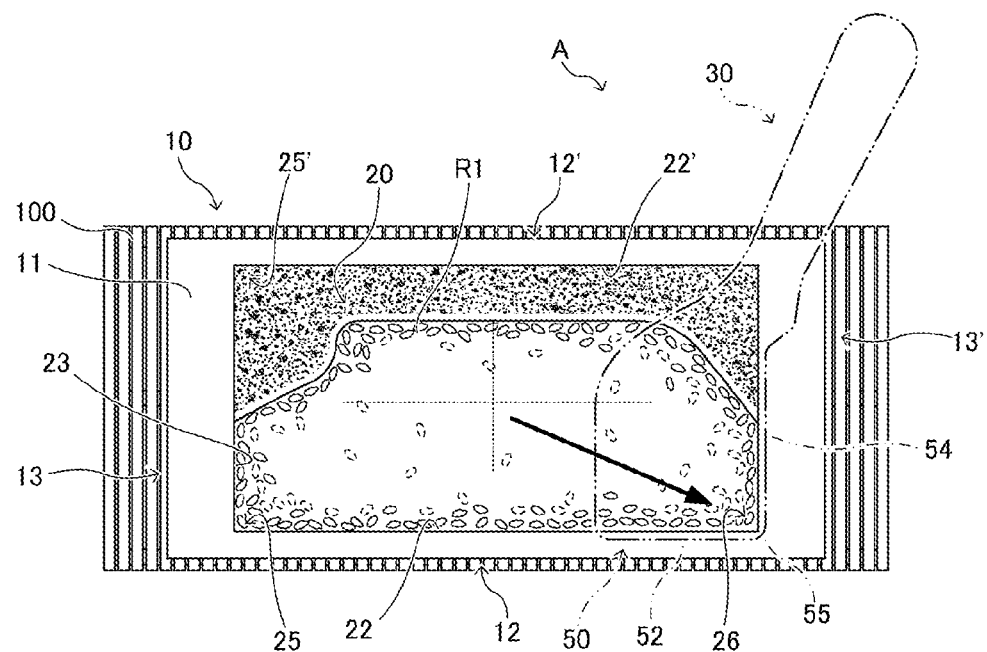
Figure 9:
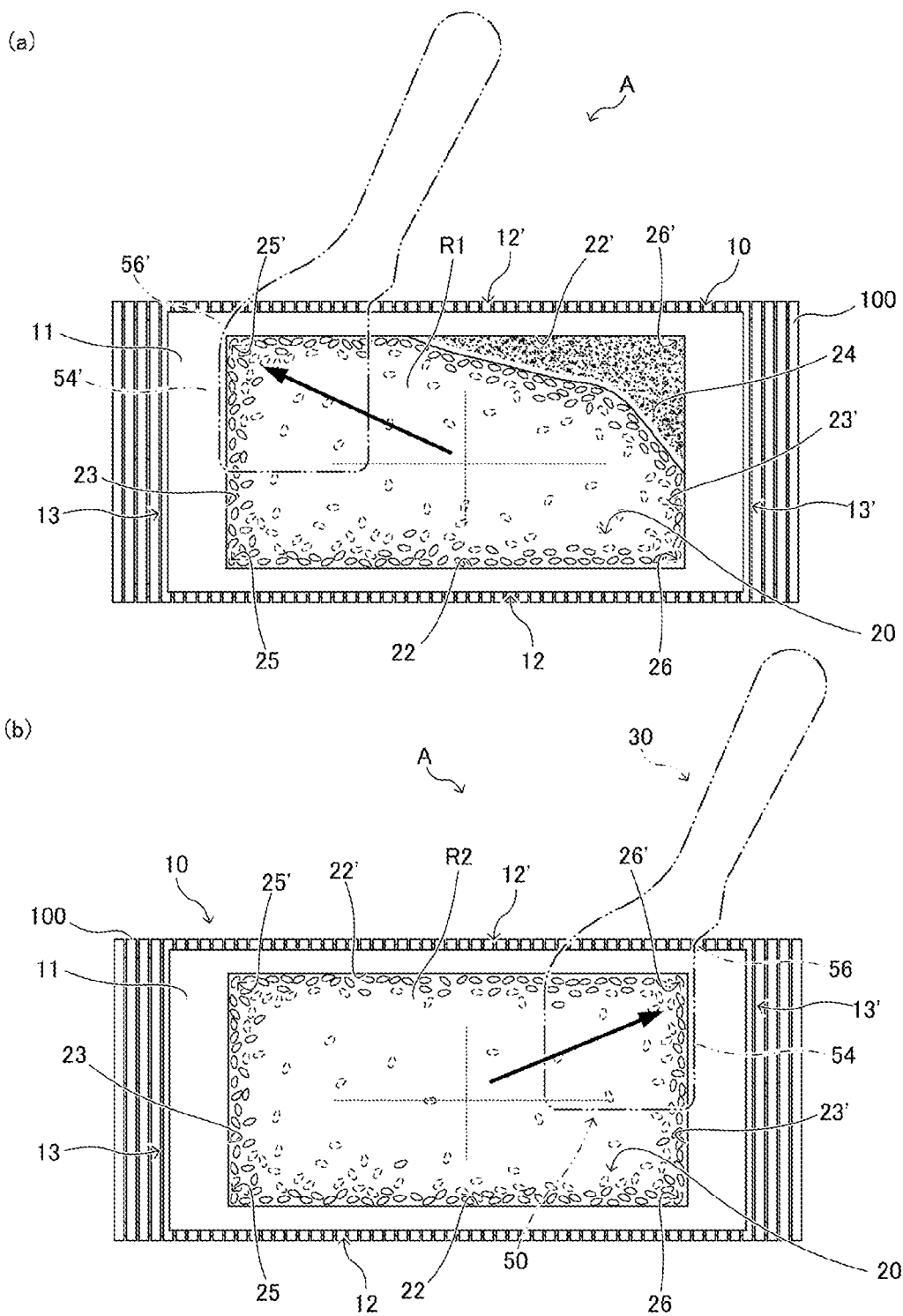
FIG. 9 are schematic plan views showing the steps of obtaining the formed cooked rice lump by leveling and spreading the cooked rice lump by the leveling spatula in the forming frame according to the present invention.
Figure 10:
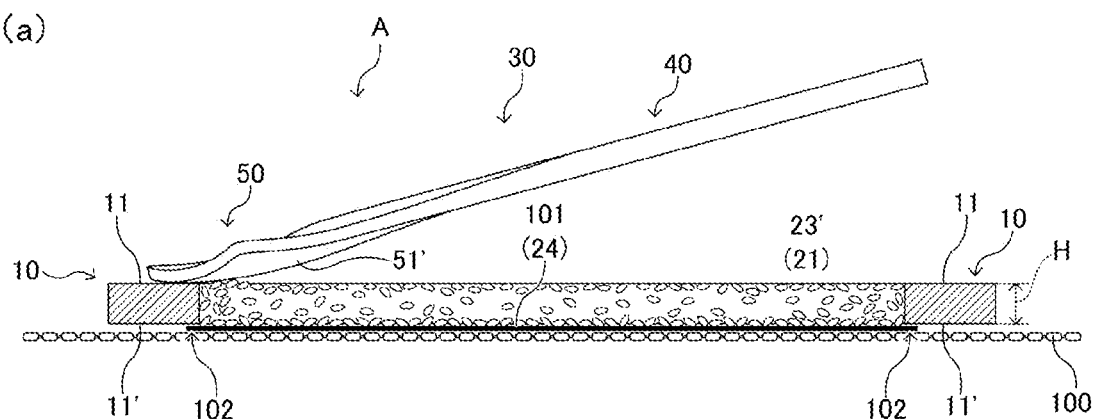
FIG. 10 are a schematic plan view and a schematic cross-sectional side view showing the steps of obtaining the formed cooked rice lump by leveling and spreading the cooked rice lump by the leveling spatula in the forming frame according to the present invention.
Figure 10:
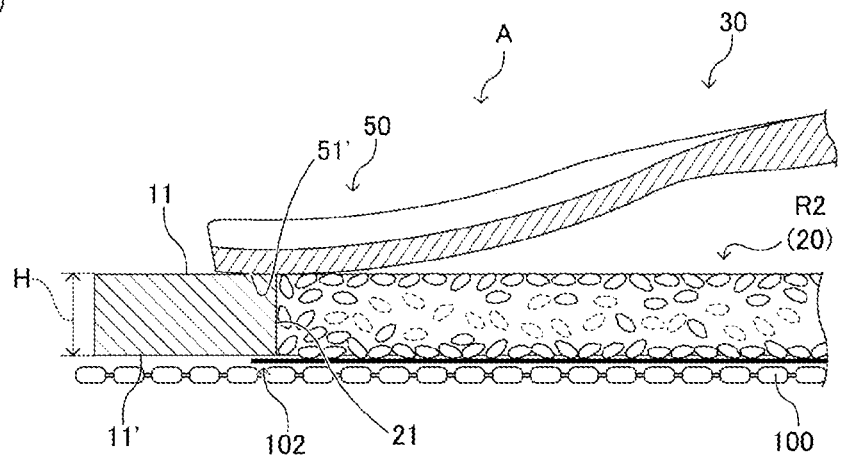
Figure 11:
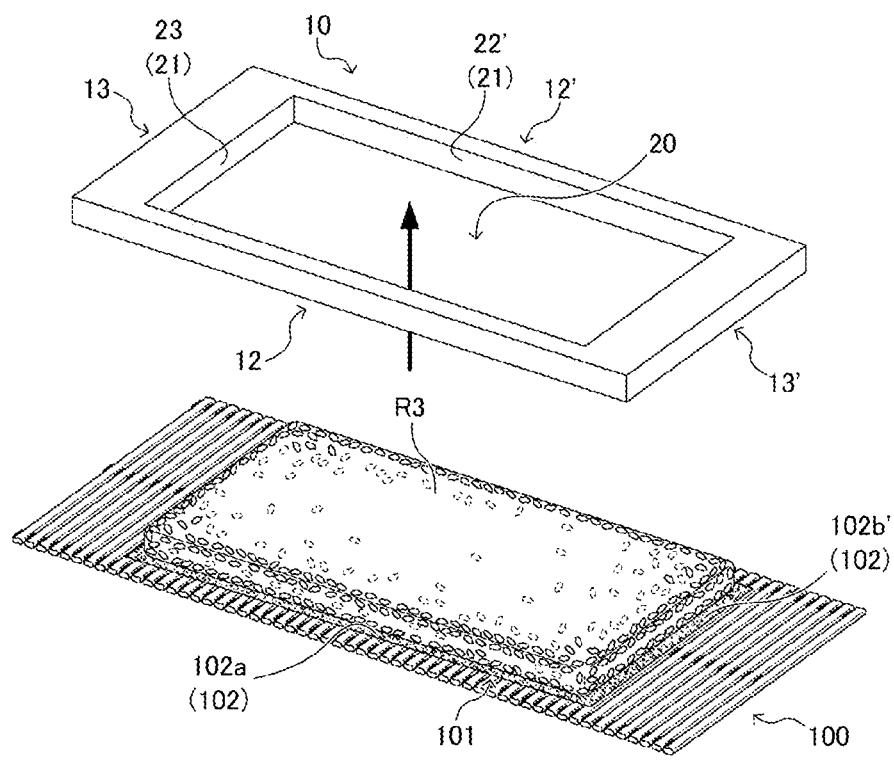
FIG. 11 is a perspective view showing steps of obtaining a sheet-shaped cooked rice by removing the forming frame from the formed cooked rice lump formed by leveling the cooked rice in the forming frame according to the present invention.

FIG. 5 are cross-sectional views of a spatula body portion of the leveling spatula taken along a line A-A and a line B-B. FIG. 6 and FIG. 7 are explanatory views showing a method of using the sheet-shaped cooked rice forming jig. FIG. 8 to FIG. 10 are schematic plan views, schematic side views, and schematic cross-sectional side view showing steps of obtaining a formed cooked rice lump by leveling and spreading cooked rice lump by the leveling spatula in the forming frame. FIG. 11 is a perspective view showing steps of obtaining a sheet-shaped cooked rice by removing the forming frame from the formed cooked rice lump formed in the forming frame.

A sheet-shaped cooked rice forming jig A according to the present invention is used for obtaining a sheet-shaped cooked rice in a state before the sheet-shaped cooked rice is rolled or folded in a process of manufacturing a cooked rice food such as a rolled sushi in a rolled shape or a rice ball in a folded shape.

As shown in FIG. 1 and FIG. 2, in general, the sheet-shaped cooked rice forming jig A is formed of: a forming frame 10 for forming a sheet-shaped cooked rice R3 (see FIG. 11) by packing a cooked rice in the forming frame 10; and a leveling spatula 30 for leveling the cooked rice packed in the forming frame 10 into a sheet shape.

That is, as shown in FIG. 1 and FIG. 2, the sheet-shaped cooked rice forming jig A can obtain the sheet-shaped cooked rice R3 as follows. A sheet-shaped food 101 is placed on a rolling mat 100 spread horizontally, the forming frame 10 is placed on the sheet-shaped food 101 along an entire peripheral portion 102 of the sheet-shaped food 101, and a cooked rice lump R1 packed in the forming frame 10 is leveled and spread, and is filled over the entire area in the forming frame 10 using the leveling spatula 30 prepared for an exclusive use thus forming a formed cooked rice lump R2, and the sheet-shaped cooked rice R3 is obtained finally by upwardly removing by pulling the forming frame 10 from the formed cooked rice lump R2.

A cooked rice food such as a rolled sushi or a rice ball in a folded shape can be obtained by rolling or folding the sheet-shaped cooked rice R3 together with the sheet-shaped food 101. The sheet-shaped food 101 used in the sheet-shaped cooked rice forming jig A is, in general, a processed food of dried seaweed or dried kelp sheet. However, a natural food such as shiso leave may be also used.

As shown in FIG. 1 and FIG. 2, the forming frame 10 is a flat-plate-like member having a predetermined thickness. As shown in FIG. 3(b), upper and lower surfaces 11, 11' of the forming frame 10 are formed into flat surfaces. As shown in FIG. 3(a), the forming frame 10 is formed in an endless shape such that a cooked rice packing portion 20 in which a cooked rice is packed is formed in the forming frame 10 such that the cooked rice packing portion 20 penetrates the forming frame 10 in a window shape. That is, the forming frame 10 is formed of a flat rectangular frame body (picture-frame-shaped body) as a whole.

As shown in FIG. 3(b), a thickness H of the forming frame 10 can be suitably decided in conformity with a thickness of the desired sheet-shaped cooked rice R3. For example, the thickness H of the forming frame 10 can be set to 5 mm to 10 mm in conformity with a thickness of the sheet-shaped cooked rice for forming a general rolled sushi or rice ball having a folded shape.

A material of the forming frame 10 is not particularly limited. For example, a plastic resin, wood, or metal can be adopted as the material of the forming frame 10. By adopting a plastic resin as a material of the forming frame 10, the forming frame 10 can be repeatedly used hygienically by cleaning while ensuring a predetermined strength, and further, the forming frame 10 can be manufactured at a low cost.

Slip-giving working which prevents the adhesion of a cooked rice as much as possible by enhancing slipping property may be applied to an inner peripheral surface 21 of the forming frame 10 which forms a cooking rice packing portion 20 in the forming frame 10. As slip-giving working, for example, metal coating which uses a ceramic or the like, slip resin coating which uses a fluoric resin or the like, or fine-mesh polishing working can be adopted.

Further, slip-preventing working may be applied to a lower surface 11' of the forming frame 10 for preventing the positional displacement of the forming frame 10 from a placed position when the forming frame 10 is placed on a horizontal placing surface of a kitchen, a chopping board, a rolling matt, or the sheet-shaped food 101. As slip-preventing working, for example, slip-preventing resin coating which uses an elastic resin or the like or coarse-mesh polishing working can be adopted.

As shown in FIG. 1, FIG. 2, and FIG. 3(a), in the forming frame 10 having such a configuration, the cooked rice packing portion 20 having a rectangular window shape which opens vertically is formed in a penetrating manner.

The cooked rice packing portion 20 functions as a cooked rice packing space for packing the cooked rice lump R1 in a state where the forming frame 10 is placed on the horizontal placing surface. The cooked rice packing portion 20 also functions as a cooked rice forming space for forming a sheet-shaped cooked rice by the forming frame along the inner peripheral surface 21 of the forming frame 10 by leveling and spreading the packed cooked rice lump R1 over the entire area in the cooked rice packing portion 20 by the leveling spatula 30.

The profile of the forming frame 10 as viewed in a plan view can be formed in an approximately circular shape, a trapezoidal shape, or a triangular shape, for example.

The shape of the cooked rice packing portion 20 as viewed in a plan view can be decided in conformity with the profile of the desired sheet-shaped cooked rice R3 as viewed in a plan view. For example, the shape of the cooked rice packing portion 20 as viewed in a plan view can be formed in a window shape having an approximately circular shape, a trapezoidal shape, or a triangular shape.

In this embodiment, as shown in FIG. 3(a), the forming frame 10 is formed in an approximately quadrangular shape as viewed in a plan view, and the cooked rice packing portion 20 formed in the forming frame 10 is formed in an approximately quadrangular shape as viewed in a plan view which is substantially similar to the profile of the forming frame 10.

To be more specific, the forming frame 10 and the cooked rice packing portion 20 formed in the forming frame 10 have, as shown in FIG. 3(a), the profiles as viewed in a plan view which are substantially similar to the profile of the sheet-shaped food 101 having a predetermined standard as viewed in a plan view. The profile of the forming frame 10 is set slightly larger than the profile of the sheet-shaped food 101, and the profile of the cooked rice packing portion 20 is set slightly smaller than the profile of the sheet-shaped food 101.

That is, as shown in FIG. 1, FIG. 6, and FIG. 7, the forming frame 10 has the shape which allows the forming frame 10 to be properly placed on the peripheral portion 102 of the sheet-shaped food 101 having a predetermined standard which is formed in an approximately quadrangular shape as viewed in a plan view, and the cooked rice packing portion 20 is formed in the shape which conforms with an approximately quadrangular region of the sheet-shaped food 101 disposed inside the peripheral portion 102 as viewed in a plan view.

As shown in FIG. 3(a), the forming frame 10 is a rectangular plate body having a picture frame shape. The forming frame 10 is formed of left and right side wall portions 12, 12' having a long angular rod-like shape, and front and rear side wall portions 13, 13' having a short flat plate shape which connect front end portions and rear end portions of the left and right side wall portions 12, 12' to each other.

That is, the inner peripheral surface 21 of the forming frame 10 is a surface which is perpendicular to a lower surface 11' of the forming frame 10, and is formed of long left and right inner surfaces 22, 22' of the left and right side wall portions 12, 12', and short front and rear inner surfaces 23, 23' of the front and rear side wall portions 13, 13'.

In other words, the cooked rice packing portion 20 is a space formed by the inner peripheral surface 21 of the forming frame 10, that is, the long left and right inner surfaces 22, 22' of the left and right side wall portions 12, 12' and the short front and rear inner side surfaces 23, 23' of the front and rear side wall portions 13, 13'. The cooked rice packing portion 20 is formed so as to form an outer peripheral surface portion of the sheet-shaped cooked rice R3 by the inner peripheral surface 21. Further, the cooked rice packing portion 20 is formed so as to have four corner portions 25, 25', 26, and 26' of an approximately right angle as viewed in a plan view.

When the forming frame 10 is placed on the horizontal placing surface, a lower opening of the cooked rice packing portion 20 is closed by the horizontal placing surface.

That is, with respect to the cooked rice packing portion 20, as shown in FIG. 1, in a state where the forming frame 10 is placed on the horizontal placing surface, the horizontal placing surface forms a mold bottom surface 24 for forming a lower surface portion of the sheet-shaped cooked rice R3.

In other words, the forming frame 10 is configured such that, in a state where the forming frame 10 is placed on the horizontal placing surface, the cooked rice packing portion 20 forms an upper-side opened forming cooked rice forming portion which is formed of the inner peripheral surface 21 of the forming frame 10 and the mold bottom surface 24 which is the horizontal placing surface.

In this embodiment, a size of the profile of the quadrangular forming frame 10 as viewed in a plan view is not particularly limited. However, for example, when the forming frame 10 is used for the sheet-shaped food 101, the size of the profile of the forming frame 10 as viewed in a plan view is set slightly larger than the size of the profile of the sheet-shaped food 101 as viewed in a plan view.

An inner size of the forming frame 10 as viewed in a plan view, that is, a size of the cooked rice packing portion 20 as viewed in a plan view is set slightly smaller than the size of the profile of the sheet-shaped food 101 as viewed in a plan view when the forming frame 10 is used for the sheet-shaped food 101.

That is, the forming frame 10 and the cooked rice packing portion 20 have sizes corresponding to various sizes of the prescribed sheet-shaped foods 101 having a full shape (longitudinal size: 200 mm to 210 mm, lateral size: 180 mm to 200 mm), a laterally half cut shape (longitudinal size: 95 mm to 105 mm, lateral size: 180 mm to 200 mm), laterally one-third shape (longitudinal size: 60 mm to 70 mm, lateral size: 180 mm to 200 mm), and laterally one-sixth shape (longitudinal size: 25 mm to 35 mm, lateral size: 180 mm to 200 mm).

To be more specific, as shown in FIG. 3(a), a longitudinal length L1 of the forming frame 10 is set to 25 mm to 230 mm, for example, corresponding to a prescribed longitudinal length of the sheet-shaped food 101.

A lateral length w1 of the forming frame 10 is set to 180 mm to 250 mm, for example, corresponding to a lateral length of the sheet-shaped food 101. The size of the forming frame 10 according to this embodiment is set such that the longitudinal length is approximately 110 mm and the lateral length is approximately 220 mm.

A longitudinal length L2 of the cooked rice packing portion 20 (a length of the short front and rear inner surfaces of 23, 23' of the front and rear side wall portions 13, 13') is set to 25 mm to 210 mm, for example, so as to form a sheet-shaped cooked rice inside the peripheral portion 102 of the sheet-shaped food 101 along the peripheral portion 102.

A lateral length W2 of the cooked rice packing portion 20 (a length of the long left and right inner surfaces 22, 22' of the left and right side wall portions 12, 12') is set to 180 mm to 250 mm, for example, corresponding to a lateral length of the sheet-shaped food 101. The size of the cooked rice packing portion 20 according to the embodiment is set such that the longitudinal length is approximately 90 mm and the lateral length is approximately 175 mm.

With such a configuration, the forming frame 10 can be made to confirm with the generally prescribed shapes of the sheet-shaped food 101 and the rolling mat 100, and flat placing surfaces of the sheet-shaped food 101 and the rolling mat 100 can be formed as the mold bottom surface 24 of the cooked rice packing portion 20 in the forming frame 10 by placing the forming frame 10 along the peripheries of the sheet-shaped food 101 and the rolling mat 100 and hence, it is possible to form the sheet-shaped cooked rice R3 where the cooked rice does not project from peripheries of the sheet-shaped food 101 and the rolling mat 100.

The left and right side wall portions 12, 12' and the front and rear side wall portions 13, 13' which form the forming frame 10 are formed respectively having predetermined widths D1, D2 so as to have areas which allow a lower surface of the spatula body portion 50 of the leveling spatula 30 described later to be brought into face contact with the upper surface 11 of the forming frame 10.

Particularly, the forming frame 10 of this embodiment is formed such that the width D1 of the left and right side wall portions 12, 12' becomes smaller than the width D2 of the front and rear side wall portions 13, 13'.

The width D1 of the left and right side wall portions 12, 12' is 5 mm to 15 mm respectively, for example. The width D2 of the front and rear side wall portions 13, 13' is set to 20 mm to 30 mm respectively, for example. In this embodiment, the width D1 of the left and right side wall portions 12, 12' is set to approximately 10 mm, and the width D2 of the front and rear side wall portions 13, 13' is set to approximately 25 mm.

With such a configuration, in placing the forming frame 10 on the sheet-shaped food 101 having a predetermined standard, forming frame 10 can be easily placed and positioned along the entire peripheral portion 102 of the sheet-shaped food 101 and hence, a placing operation of the forming frame 10 which conforms with the entire periphery of the sheet-shaped food 101 can be simplified.

The width D2 of the front and rear side wall portions 13, 13' is set large extending in the longitudinal direction.

Accordingly, a placement contact area of the forming frame 10 with the placing surface of the sheet-shaped food 101 or the like together with an upper surface of the peripheral portion 102 of the sheet-shaped food 101 is enlarged and hence, the sheet-shaped food 101 can be firmly pressed by the forming frame 10 so that the positional displacement of the forming frame 10 on the sheet-shaped food 101 can be prevented whereby a stable placement state of the forming frame 10 on the sheet-shaped food 101 can be realized.

As shown in FIG. 3(c), a forming frame 10' which is a modification of the forming frame 10 may be formed such that a recessed portion 16 is formed on a portion of an upper surface 11 of the forming frame 10' which forms a cooked rice packing portion 20, that is, an upper end edge portion of an inner peripheral surface 21 of the forming frame 10'.

That is, in the forming frame 10', the recessed portion 16 is formed at center portions of the left and right side wall portions 12, 12' of the forming frame 10' in the longitudinal direction such that a thickness H of the left and right side wall portions 12, 12' is reduced to a thickness H1 at the center portion in the longitudinal direction (H1<H).

Such a recessed portion 16 forms a curved recessed surface 16a by gradually decreasing the thickness of the left and right side wall portions 12, 12' of the forming frame 10' from both ends of the left and right side wall portions 12, 12' toward the center. A minimum thickness H1 between a lowermost bottom portion of the recessed portion 16 and the lower surface 11' is set to approximately ½ to ⅔ of the maximum thickness H of the forming frame 10'. In other words, the recessed portions 16 where the thickness is set to the thickness H1 which is approximately ½ to ⅔ inclusive of the thickness H are formed on the upper surface 11 of the frame.

With such a configuration, the thickness H of the forming frame 10' can be decreased to the thickness H1 of the thin-walled portion of the forming frame 10' corresponding to a degree of indentation of the recessed portion 16. That is, corresponding to the recessed portion 16, a thickness of a center portion of the formed cooked rice lump R2 formed in the cooked rice packing portion 20 in the forming frame 10' in a longitudinal direction, that is, a thickness of a center portion of the sheet-shaped cooked rice R3 in a longitudinal direction can be set to a thickness which agrees with the thickness H1 smaller than the thickness H of both end portions in the longitudinal direction.

Accordingly, in the forming frame 10', by forming the recessed portions 16 preliminarily such that a portion of a cooked rice food which corresponds to a folding portion on which an amount of cooked rice is concentrated at the time of forming rice ball in a folded shape as a cooked rice food becomes a relatively thin portion, a thickness of the sheet-shaped cooked rice R3 at the folding portion can be decreased and hence, it is possible to prevent the occurrence of a case where a cooked rice projects to the outside of the rice ball or the sheet-shaped food or folding of the sheet-shaped cooked rice R3 is obstructed.

In this embodiment, the portion of the forming frame 10' which corresponds to the folding portion on which an amount of cooked rice concentrates at the time of forming a rice ball in a folded shape (a cooked rice food where the sheet-shaped cooked rice R3 is folded in tow in a longitudinal direction) is the center portion of the forming frame 10' in a longitudinal direction. Depending on a shape of a cooked rice food, a recessed portion may be formed on upper surface sides of the front and rear side wall portions 13, 13'.

In this embodiment, on the upper surface 11 of the forming frame 10, the recessed portions 16 are formed over the entire left and right side wall portions 12, 12' in the width direction. However, the recessed portions 16 may be formed partially on portions of the upper surfaces on the left and right side wall portions 12, 12' on an inner side (inner peripheral surface 21). That is, the recessed portions 16 may be formed on portions which form the cooked rice packing portion 20 on the upper surface 11 of the forming frame 10.

As shown in FIG. 1, the leveling spatula 30 is formed of a grip portion 40 and a spatula body portion 50 in a flat shape extending from one side of the grip portion 40.

The leveling spatula 30 can simplify a forming operation of the formed cooked rice lump R2 along a shape of the cooked rice packing portion 20 by only pressing and spreading the formed cooked rice lump R2 packed into the cooked rice packing portion 20 of the forming frame 10 such that a lower surface 51' of the spatula body portion 50 is brought into face contact with the upper surface 11 of the forming frame 10.

As shown in FIG. 4(a) and FIG. 4(b), the grip portion 40 is formed in a flat elongated shape having a fixed width such that an operator's hand can grip. A predetermined width D3 and a predetermined length L3 of the grip portion 40 are not particularly limited provided that the grip portion 40 can be gripped by an operator's hand. For example, by setting a width D3 of the grip portion 40 to 20 mm to 25 mm and by setting a length of the grip portion 40 to 100 mm to 150 mm, the grip portion 40 conforms to a size of a palm of an operator in general which allows the operator to grip the grip portion 40.

The grip portion 40 is formed such that a width of the grip portion 40 is gradually narrowed from a proximal end to a distal end, and a twisted shape is formed between a portion of the grip portion 40 on a proximal end side of the grip portion 40 and the spatula body portion 50. With such a configuration, when an operator grips the grip portion 40, a gripping force is easily smoothly applied to the grip portion 40.

A finger placing recessed portion which is brought into contact with a tip end of a finger or a front side of a thumb when an operator grips the grip portion 40 with his finger may be formed along an imaginary axis P of the grip portion 40.

With such a configuration, the operator can firmly grip the grip portion with his finger so that the operator can easily press the grip portion 40 downwardly with a front side of his thumb so as to transmit a downward pressing force from the front side of the thumb to the center of gravity G of the spatula body portion 50 described later.

A lower surface 41' of the grip portion 40 is formed in an arcuate cross section where the lower surface 41' is continuously formed with left and right outer side portions 42, 42' along an axial direction of the grip portion 40 (imaginary axis P), and can be formed to conform with a gripping shape of an operator's palm as much as possible. That is, by forming the lower surface 41' of the grip portion 40 into a curved surface having, for example, a semicircular arc shape as viewed in cross section, the gripping property of the grip portion 40 can be enhanced.

The shape of the spatula body portion 50 as viewed in a plan view is not particularly limited provided that the spatula body portion 50 has a flat shape, and has an area capable of leveling and spreading the formed cooked rice lump R2 packed into the cooked rice packing portion 20 of the forming frame 10. However, the shape of the spatula body portion 50 as viewed in a plan view may be an approximately triangular shape or an approximately circular shape, for example.

The spatula body portion 50 of this embodiment is formed in an approximately flat square shape having upper and lower surfaces 51, 51' which are respectively connected to flat upper and lower surfaces 41, 41' of the grip portion 40. The lower surface 51' of the spatula body portion 50 forms a cooked rice contact surface at the time of leveling and spreading the formed cooked rice lump R2.

The spatula body portion 50 has an approximately rectangular shape as viewed in a plan view, and is connected to the grip portion 40 in a mode where the spatula body portion 50 is inclined with respect to an imaginary axis P of the grip portion 40. The spatula body portion 50 has, as an edge portion which forms an approximately rectangular shape as viewed in a plan view, a distal end edge portion 52 which is disposed on a distal end side and extends in a straight line manner, a proximal end edge portion 53 which gradually bulges outward from one side of the grip portion 40 and extends in a curved shape, and left and right end edge portions 54, 54' which extend in a straight line manner at both ends of the distal end edge portion 52.

The distal end edge portion 52 forms frontward left and right side corner portions 55, 55' having an approximately right-angled shape together with the left and right end edge portions 54, 54'. The left end edge portion 54 forms a rearward left side corner portion 56 having an approximately obtuse-angled shape together with the other side of the grip portion 40. The right end edge portion 54' forms a rearward right side corner portion 56' having an obtuse-angled shape together with the proximal end edge portion 53.

The size of the spatula body portion 50 may be set such that an area which allows the lower surface of the spatula body portion 50 to be brought into contact with the formed cooked rice lump R2 is held.

In the case where the spatula body portion 50 has a rectangular shape as in the case of this embodiment, by setting a longitudinal length (a length of the distal end edge portion 52) to 50 mm to 60 mm, and a lateral length (a length of the left and right end edge portions 54, 54') to 60 mm to 70 mm, operability of leveling a cooked rice by the leveling spatula 30 can be enhanced.

Particularly, the length of the left and right end edge portions 54, 54' of the spatula body portion 50 is set to a length which is ½ or more of the longitudinal length L2 of the cooked rice packing portion 20 (a length of the inner side surfaces 23, 23' of the front and rear side wall portions 13, 13'). The length of the left and right end edge portions 54, 54' of the spatula body portion 50 of this embodiment is set to a length approximately half of the longitudinal length L2 of the cooked rice packing portion 20 (the length of the inner side surfaces 23, 23' of the front and rear side wall portions 13, 13').

In the spatula body portion 50 having a quadrangular shape as viewed in a plan view, among four quadrangular corner portions 55, 55', 56, 56', one corner portion 56 or a portion in the vicinity of one corner portion 56 forms a connecting proximal end portion with the grip portion 40, and the center of gravity G of the spatula body portion 50 is arranged on the imaginary axis P of the grip portion 40 or in the vicinity of the imaginary axis P.

Particularly, the frontward right side corner portion 55' diagonal to one corner portion 56 is arranged on the imaginary axis P of the grip portion 40 or in a vicinity of the imaginary axis P. The center of gravity G of the spatula body portion 50 is arranged in the vicinity of and slightly on a right side and above the imaginary axis P of the grip portion 40.

In such a configuration, the center of gravity G of the spatula body portion 50 is an intersection between straight lines which connect intermediate points of respective quadrangular opposedly facing sides as shown in FIG. 4(b). That is, the center of gravity G of the spatula body portion 50 is the intersection between a vertical imaginary vertical straight line which connects an intermediate point of the distal end edge portion 52 and an intermediate point of the proximal end edge portion 53 (see A-A chained line) and a lateral imaginary lateral straight line which connects intermediate points of the left and right end edge portions 54, 54' (see C-C chained line).

The spatula body portion 50 extends from the grip portion 40 in a state where the distal end edge portion 52 is inclined by a predetermined angle α with respect to the imaginary axis P of the grip portion 40. That is, in the spatula body portion 50 having an approximately rectangular shape as viewed in a plan view, the leveling spatula 30 is formed in a shape such that the leveling spatula 30 has the pair of left and right end edge portions 54, 54' arranged parallel to each other on both sides of the imaginary axis P of the grip portion 40 in a sandwiched manner, and the direction along which these left and right end edge portions 54, 54' extend is inclined by a predetermined angle with respect to the imaginary axis P.

To be more specific, as shown in FIG. 4 (b), as viewed in a plan view of the leveling spatula 30, an imaginary bisector line (A-A chained line) which extends in a center portion between the left and right end edge portions 54, 54' of the spatula body portion 50 and divides the spatula body portion 50 into left and right sides is inclined with respect to a direction orthogonal to the imaginary axis P of the grip portion 40. The inclination angle α is approximately 30° to 60°, for example.

In other words, the leveling spatula 30 is formed in an approximately Japanese "︿" shape as viewed in a plan view. That is, as shown in FIG. 4 (b), the center of gravity G2 in a front half portion of the spatula body portion 50 is arranged in an eccentric manner such that the most portion of the front half portion of the spatula body portion 50 (portion on a front side of a B-B chained line) is disposed on one side out of left and right sides with respect to the imaginary axis P of the grip portion 40.

With such a configuration, when an operator grips the grip portion 40, the operator places his thumb to the flat upper surface 41 of the grip portion 40 in the vicinity of a proximal end of the spatula body portion 50, and grips the trunk portion of the grip portion 40 with his fingers other than the thumb. Accordingly, a vertical direction movement, a longitudinal direction movement and a left and right movement of an operator from the grip portion 40 can be accurately reflected on the spatula body portion 50 formed on the distal end of the grip portion and hence, operability of the leveling spatula 30 in a leveling and spreading operation of the cooked rice lump R1 in the forming frame 10 can be enhanced.

As shown in FIGS. 4(a) and 5 (a), the spatula body portion 50 has a curved surface which is gently curved from a proximal end to a distal end.

In such a configuration, a proximal end side of the spatula body portion 50 is disposed on a grip portion 40 side in an extending direction of the grip portion 40, and a distal end side of the spatula body portion 50 is disposed on a side opposite to the grip portion 40 side. In this embodiment, the plate-shaped spatula body portion 50 having an approximately fixed thickness as a whole has a curved surface shape which is gently curved as a whole.

To be more specific, the spatula body portion 50 is curved depicting a gentle curve in a downwardly convex shape such that a curved top portion T is positioned on the center of gravity G or in the vicinity of the center of gravity G, that is, on the imaginary axis P of the grip portion 40 shown in FIG. 5(*b*), the upper surface 51 is formed in a curved concave surface, and a lower surface 51' is formed in a curved convex shape.

With such a configuration, by finely adjusting a contact area with the cooked rice lump R1 along the lower surface 51' of the spatula body portion 50, a leveling and spreading operation of the cooked rice lump R1 can be accurately performed while adjusting a leveling amount of a cooked rice.

The sheet-shaped cooked rice forming jig A having such a configuration can form and manufacture the sheet-shaped cooked rice R3 as follows. In the description made hereinafter, an in-use example of the sheet-shaped cooked rice forming jig A is described where the sheet-shaped cooked rice R3 having the sheet-shaped food 101 is manufactured. However, it is needless to say that the sheet-shaped food 101 is not indispensable, and the sheet-shaped cooked rice R3 can be manufactured by directly placing the forming frame 10 on the rolling mat 100 or a horizontal placing surface of a kitchen or the like.

Firstly, as shown in FIG. 6, the sheet-shaped food 101 is placed and set in a spreading manner in a flat shape on the upper surface of the rolling mat 100 which is spread in a flat shape on a horizontal surface of a kitchen or the like. A seaweed sheet is adopted as the sheet-shaped food 101.

Next, the forming frame 10 is placed on the sheet-shaped food 101 along the peripheral portion 102 of the sheet-shaped food 101.

To be more specific, the forming frame 10 is positioned in the left and right side directions by positioning the left and right side wall portions 12, 12' of the forming frame 10 on the upper positions of the left and right peripheral portions 102*a*, 102*a'* of the sheet shaped food 101.

Next, the forming frame 10 is positioned in the longitudinal direction such that the front and rear side wall portions 13, 13' of the forming frame 10 are positioned on the upper positions of the front and rear side peripheral portions 102*b*, 102*b'* of the sheet-shaped food 101, and the forming frame 10 is placed on the sheet-shaped food 101 corresponding to the entire periphery of the sheet-shaped food 101.

That is, an operation of placing the forming frame 10 on the sheet-shaped food 101 is performed by arranging the center position made by diagonal lines of the forming frame 10 (cooked rice packing portion 20) having a quadrangular shape on the center portion made by the diagonal lines of the sheet-shaped food 101 having a quadrangular shape and by making the respective quadrangular sides of the forming frame 10 (cooked rice packing portion 20) correspond to the respective quadrangular sides of the sheet-shaped food 101 in parallel.

As a result, a lower opening having a quadrangular shape as viewed in a plan view of the cooked rice packing portion 20 inside the forming frame 10 is closed by the sheet-shaped food 101, and as shown in FIG. 7, the mold bottom surface 24 is formed in the cooked rice packing portion 20 by a regional portion other than a peripheral portion of the sheet-shaped food 101 which closes the sheet-shaped food 101. That is, the formed cooked rice lump R2 is formed in a mold bottom surface 24 along the peripheral portion 102 of the sheet-shaped food 101.

In forming the formed cooked rice lump R2, as shown FIG. 7, firstly, a predetermined amount of cooked rice lump R1 is placed and packed at the center of the mold bottom surface 24 of the cooked rice packing portion 20. The cooked rice lump R1 is formed in an approximately rectangular shape as viewed in a plan view approximately similar to a shape of the cooked rice packing portion 20 as viewed in a plan view in a state where the cooked rice lump R1 is a fixed volume of cooked rice and has a thickness larger than a thickness of the forming frame 10.

That is, the cooked rice lump R1 is placed at the approximately center of the mold bottom surface 24 such that the respective four corner portions of the cooked rice lump R1 are arranged diagonally in the cooked rice packing portion 20 such that four corner portions of the cooked rice lump R1 correspond to four corner portions 25, 25', 26, 26' of the cooked rice packing portion 20 in the forming frame 10, and an intersecting point between diagonal lines of the cooked rice lump R1 is arranged at the intersecting point between the diagonal lines of the cooked rice packing portion 20.

A capacity of a cooked rice in the cooked rice lump R1 is preliminary measured to become substantially equal to a capacity of the cooked rice packing portion 20, and the cooked rice lump R1 is formed preliminary by being packed to a tapper or the like having an approximately cubic shape.

As shown in FIG. 7 to FIG. 10, such a cooked rice lump R1 is leveled and spread by the leveling spatula 30 such that the lower surface 51' having a curved concave shape of the spatula body portion 50 of the leveling spatula 30 is brought into contact with a cooked rice lump R1 disposed at a center portion of the cooked rice packing portion 20, the lower surface 51' of the spatula body portion 50 and the upper surface 11 of the forming frame 10 are set parallel to each other in plane thus filling the cooked rice packing portion 20 of the forming frame 10 by the cooked rice without forming a gap.

The leveling spatula 30 is moved relative to the forming frame 10 in a state where the distal end edge portion 52 of the spatula body portion 50 is held in a direction along a longitudinal direction of the forming frame 10.

In the examples shown in FIG. 8 to FIG. 10, an operator positioned on one side (a right side in each drawing) of the forming frame 10 in a longitudinal direction positions the grip portion 40 to one side (an upper side in each drawing) of the forming frame 10 in a lateral direction, and operates the leveling spatula 30 in a direction that a left and right end edge portion 54 side of the spatula body portion 50 is set as a near side (operator side). In this case, the grip portion 40 is positioned on a near side due to inclination of the left and right end edge portions 54, 54' of the spatula body portion 50 with respect to the imaginary axis P of the grip portion 40.

That is, the cooked rice lump R1 placed on the mold bottom surface 24 of the cooked rice packing portion 20 is, as viewed in a plan view, partitioned into four imaginary leveling regions at frontward and rearward left and right half portions having the corner portions corresponding to the respective corner portions of the cooked rice packing portion 20 of the forming frame 10 (regions partitioned by broken lines which connect intermediate points of the respective quadrangular sides of the cooked rice lump R1 as viewed in a plan view in FIG. 7 to FIG. 9), and the cooked rice lump R1 is sequentially leveled and spread by the leveling spatula 30 such that the cooked rice lump R1 extends toward four corner portion 25, 25', 26, 26' of the cooked rice packing portion 20 corresponding to the respective four corner portions from a center portion of the cooked rice lump R1, using relative positions of the respective portions between the leveling spatula 30 and the cooked rice packing portion 20 for each imaginary leveling region.

Particularly, in this embodiment, the "leveling and spreading forming operation" is performed by sequentially performing the following operations using the relative positions of the respective portions between the leveling spatula 30 and the cooked rice packing portion 20 as indexes. The frontward right side corner portion 55' of the leveling spatula 30 is moved corresponding to the frontward left corner portion 25 of the cooked rice packing portion 20 with respect to a front left half portion of the cooked rice lump R1, the frontward left side corner portion 55 of the leveling spatula 30 is moved corresponding to the rearward left corner portion 26 of the cooked rice packing portion 20 with respect to a rear left half portion of the cooked rice lump R1, and the rearward right side corner portion 56' of the leveling spatula 30 is moved corresponding to the frontward right corner portion 25' of the cooked rice packing portion 20 with respect to a front right half portion of the cooked rice lump R1, and the rearward left side corner portion 56 of the leveling spatula 30 is moved corresponding to the rearward right corner portion 26' of the cooked rice packing portion 20 with respect to a rear right half portion of the cooked rice lump R1. With such operations, the cooked rice lump R1 is leveled and spread over the entire region in the cooked rice packing portion 20.

To be more specific, with respect to the front side left half portion having the front side left corner portion of the cooked rice lump R1 set at the center portion of the cooked rice packing portion 20, as shown in FIG. 8(a), as viewed in a plan view, the cooked rice lump R1 is leveled and spread by moving the spatula body portion 50 toward a frontward left side while pressing the cooked rice lump R1 downward (see an arrow) by positioning the right end edge portion 54' and the distal end edge portion 52 of the spatula body portion 50 respectively parallel to the left half portion of the front side wall portion 13 (short front inner surface 23) and the upper half portion of the left side wall portion 12 (long left inner surface 22) of the forming frame 10, and by positioning the frontward right side corner portion 55' of the spatula body portion 50 at the frontward left corner portion 25 of the cooked rice packing portion 20.

With respect to the rear side left half portion having the rear side left corner portion of the cooked rice lump R1, as shown in FIG. 8(b), as viewed in a plan view, the cooked rice lump R1 is leveled and spread by moving the spatula body portion 50 toward a rearward left side while pressing the cooked rice lump R1 downward (see an arrow) by positioning the left end edge portion 54 and the distal end edge portion 52 of the spatula body portion 50 respectively parallel to the left half portion of the rear side wall portion 13' (short rear inner surface 23') and the rear half portion of the left side wall portion 12 (long left inner surface 22) of the forming frame 10, and by positioning the frontward left side corner portion 56 of the spatula body portion 50 at the rearward left corner portion 26 of the cooked rice packing portion 20.

With respect to the front side right half portion having the front side right corner portion of the cooked rice lump R1, as shown in FIG. 9(a), as viewed in a plan view, the cooked rice lump R1 is leveled and spread by moving the spatula body portion 50 toward a frontward right side while pressing the cooked rice lump R1 downward (see an arrow) by positioning the right end edge portion 54' of the spatula body portion 50 parallel to the right half portion of the front side wall portion 13 of the forming frame 10 (short front inner surface 23), and by positioning the rearward right side corner portion 56' of the spatula body portion 50 at the frontward right corner portion 25' of the cooked rice packing portion 20.

With respect to the rear side right half portion having the rear side right corner portion of the cooked rice lump R1, as shown in FIG. 9(b), as viewed in a plan view, the cooked rice lump R1 is leveled and spread by moving the spatula body portion 50 toward a rearward left side while pressing the cooked rice lump R1 downward (see an arrow) by positioning the left end edge portion 54 of the spatula body portion 50 parallel to the right half portion of the rear side wall portion 13' (short rear inner surface 23') of the forming frame 10, and by positioning the rearward left side corner portion 56 of the spatula body portion 50 at the rearward right corner portion 26' of the cooked rice packing portion 20.

When the cooked rice lump R1 is leveled and spread to an area in the vicinity of the forming frame 10, that is, to longitudinal left and right inner surfaces 22, 22' of the left and right side wall portions 12, 12' or the short front and rear inner surfaces 23, 23' of the front and rear side wall portions 13, 13', as shown in FIG. 10(a) and FIG. 10(b), the lower surface 51' of the spatula body portion 50 is brought into face contact with the upper surface 11 of the forming frame 10 and is made to slide so that the cooked rice lump R1 is pressed downward by the spatula 30, and the cooked rice lump R1 is pressed and leveled to the inside of the frame 10 such that a thickness of the cooked rice becomes equal to the thickness H of the forming frame 10. Accordingly, the cooked rice lump R1 is brought into contact with the inner peripheral surface 21 of the forming frame 10.

That is, the spatula body portion 50 downwardly presses and levels the upper surface of the cooked rice lump R1 which is spread over the entire region in the cooked rice packing portion 20 in a substantially flat surface such that the upper surface of the cooked rice lump R1 becomes approximately coplanar with the upper surface 11 of the forming frame 10 thus forming the formed cooked rice lump R2 which has approximately the same thickness as the thickness of the forming frame 10 and the shape which conforms to the shape of the cooked rice packing portion 20.

As described previously, by performing a leveling and spreading operation of the cooked rice lump R1 in a stepwise manner by making the respective corner portions 55, 55', 56, 56' of the spatula body portion 50 having a flat quadrangular shape correspond to the respective corner portions 26, 25, 26', 25' of the cooked rice packing portion 20 of the forming frame 10, it is possible to perform the "leveling and spreading forming operation" for forming the formed cooked rice lump R2 having the thickness which agrees with the thickness H of the forming frame 10 and the shape which agrees with the shape of the cooked rice packing portion 20.

A method of manufacturing a sheet-shaped cooked rice using the sheet-shaped cooked rice forming jig A according to the above-mentioned embodiment includes the following steps. That is, the manufacturing method includes: a first step of setting the cooked rice lump R1 having an approximately cubic-shape on a center portion of the cooked rice packing portion 20 with respect to the forming frame 10 on the sheet-shaped food 101 placed on the rolling mat 100; and a second step of leveling by pressing and spreading the cooked rice lump R1 toward the respective corner portions of the cooked rice packing portion 20 which correspond to the respective corner portions of the cooked rice lump R1 as viewed in a plan view by the leveling spatula 30.

Particularly, as in the case of the forming frame 10 of this embodiment having a rectangular frame shape, in the second step of performing leveling and spreading of the cooked rice lump R1, the leveling and spreading operation is substantially performed in four stages corresponding to four corner portions 25, 25', 26, 26' of the cooked rice packing portion 20. However, in the second step, the order of the leveling and spreading operation in four stages is not limited to this embodiment, and may be suitably decided.

Then, as shown in FIG. 11, a third step of removing the formed cooked rice lump R2 from the cooked rice packing portion 20 by pulling up the forming frame 10 from the formed cooked rice lump R2 which is formed in the forming frame 10 is performed. That is, "frame removing operation" for taking out the sheet-like cooked rice R3 is performed.

That is, a contact surface of the formed cooked rice lump R2 which is brought into contact with the forming frame 10 is the inner peripheral surface 21. Accordingly, the adhesion direction of the forming frame 10 with respect to the cooked rice on an outer periphery of the formed cooked rice lump R2 is orthogonal to the upper removing direction of the forming frame 10. As a result, an upward pulling up stress of the forming frame 10 can work with certainty as a separating force orthogonal to the adhesion direction with respect to an adhesion portion of the formed cooked rice lump R2 to the forming frame 10 and hence, "forming frame removal operation" can be easily and speedily performed.

As a result, as shown in FIG. 11, "cooked rice non-uniform thickness spots" are eliminated and hence, it is possible to manufacture the sheet-shaped cooked rice R3 having a fixed shape and a fixed thickness. Ingredients are placed on the sheet-shaped cooked rice R3 manufactured in this manner and, thereafter, the sheet-shaped cooked rice R3 is rolled or folded so that a cooked rice food such as a rolled sushi or a rice ball in a folded shape can be manufactured.

As has been described heretofore, according to the present invention, it is possible to simply manufacture a sheet-shaped cooked rice which has no "cooked rice non-uniform thickness spots", has a uniform thickness and conforms to the shape of the cooked rice packing portion by simply performing the operation where the forming frame is placed on the horizontal flat placing surface such as the rolling mat or the sheet-shaped food, a cooked rice lump is packed into the cooked rice packing portion of the forming frame, and the cooked rice is leveled flat along the forming frame using the leveling spatula prepared for an exclusive use.

That is, by performing an operation of leveling and spreading a cooked rice lump packed into the cooked rice packing portion in the forming frame approximately parallel to the plane such that the lower surface of the spatula body portion is brought into contact with the upper surface of the forming frame using the spatula body portion of the leveling spatula prepared for an exclusive use, it is possible to form the formed cooked rice lump having a fixed thickness which agrees with the thickness of the frame by filling a cooked rice in the entire region of the cooked rice packing portion in the frame without forming a gap while preventing the cooked rice from projecting to the outside from the frame.

Furthermore, the contact surface of the cooked rice lump which is brought into contact with the forming frame forms the inner peripheral surface of the forming frame approximately orthogonal to the downward pressing direction of the cooked rice lump by the leveling spatula. Accordingly, the contact area of the cooked rice to the frame can be reduced and hence, there is no possibility that a downward stress generated by a leveling operation of the cooked rice is directly applied to the inner peripheral surface of the frame via the cooked rice whereby it is possible to suppress inadvertent adhesion of cooked rice to the forming frame as much as possible.

Further, even when cooked rice is brought into contact with and adheres to the inner peripheral surface, the direction orthogonal to the inner peripheral surface of the forming frame becomes the adhesion direction of the cooked rice to the forming frame. Accordingly, a stress orthogonal to the frame inner peripheral surface to the frame adhesion portion can be transmitted with certainty as a separating force for releasing an adhesion state of cooked rice.

Accordingly, in obtaining the sheet-shaped cooked rice by removing the formed cooked rice lump from the forming frame, the forming frame which surrounds the outer periphery of the formed cooked rice lump placed on the flat placing surface can be easily removed by upwardly pulling up the forming frame and hence, it is possible to acquire an advantageous effect that the sheet-shaped cooked rice having no "cooked rice non-uniform thickness spots" and having a fixed shape and a fixed thickness can be repeatedly manufactured.

That is, it is possible to accurately and easily perform "leveling, spreading and forming operation" which forms the formed cooked rice lump which conforms with the shape of the cooked rice packing portion in the forming frame by the forming frame and the leveling spatula formed in conformity with the forming frame, and "forming frame removal operation" which removes formed cooked rice lump in the forming frame from the cooked rice packing portion of the frame and takes out the sheet-shaped cooked rice.

REFERENCE SIGNS LIST

A: sheet-shaped cooked rice forming jig
10: forming frame
20: cooked rice packing portion
30: leveling spatula
40: grip portion
50: spatula body portion

The invention claimed is:
1. A sheet-shaped cooked rice forming jig comprising:
   a forming frame for forming a sheet-shaped cooked rice, the sheet-shaped cooked rice being formed by packing a cooked rice in the forming frame; and
   a leveling spatula for leveling the cooked rice packed in the forming frame into a sheet shape, wherein
   the forming frame is formed of a rectangular picture-frame-shaped body comprising a left wall portion, a right wall portion, a front wall portion, and a rear wall portion,
   the front and rear wall portions connect front and rear ends of the left and the right wall portions,
   inner walls of the left wall portion, the right wall portion, the front wall portion, and the rear wall portion form a through-hole as a cooked rice packing portion, the cooked rice being packed in the cooked rice packing portion,
   the cooked rice packing portion has four corners each having a right angle as viewed in a plan view,
   the leveling spatula is formed of: a grip portion; and a spatula body portion extending from one side of the grip portion and having a flat shape,
   the grip portion is formed in a flat elongated shape, the spatula body portion is formed in an approximately flat quadrangular shape such that the spatula body portion is formed continuously with a flat surface of the grip portion, a rearward right side corner portion of the spatula body portion or a portion of the spatula body portion in a vicinity of the rearward right side corner portion forms a proximal end edge portion connected with the grip portion, and a center of gravity of the spatula body portion is arranged on an imaginary axis of the grip portion or in a vicinity of the imaginary axis of the grip portion, the proximal end edge portion gradually bulges outward from one side of the grip portion and extends in a curved shape, and a right end edge portion of the spatula body portion forms the rearward right side corner portion having an obtuse-angled shape together with the proximal end edge portion.

2. The sheet-shaped cooked rice forming jig according to claim 1, wherein the spatula body portion is curved from a proximal end to a distal end of the spatula body portion, an upper surface of the spatula body portion has a curved concave shape, a lower surface of the spatula body portion has a downwardly curved convex shape with a curved top portion on an imaginary axis of the grip portion.

3. The sheet-shaped cooked rice forming jig according to claim 1, wherein a recessed portion is formed on a portion of the forming frame upper surface where the cooked rice packing portion is formed.

4. The sheet-shaped cooked rice forming jig according to claim 1, wherein the spatula body portion has a right edge and a left edge, the right edge is parallel to the left edge, the right edge and the left edge are located such that the imaginary axis of the grip portion is located between the right edge and the left edge, and the left and right edges of the spatula body portion are inclined with respect to the imaginary axis of the grip portion.

5. The sheet-shaped cooked rice forming jig according to claim 1, wherein frontward left and right side corner portions of the spatula body portion have an approximately right-angled shape.

6. The sheet-shaped cooked rice forming jig according to claim 1, wherein a rearward left side corner portion of the spatula body portion has an approximately reflex-angled shape together with another side of the grip portion.

* * * * *